United States Patent

[11] 3,610,555

| [72] | Inventor | Bruno A. Nagler<br>New York, N.Y. |
|---|---|---|
| [21] | Appl. No. | 827,492 |
| [22] | Filed | May 21, 1969 |
| [45] | Patented | Oct. 5, 1971 |
| [73] | Assignee | Vertidynamics Corporation<br>New York, N.Y.<br>Continuation-in-part of application Ser. No. 600,702, Dec. 9, 1966, now abandoned, which is a continuation-in-part of application Ser. No. 532,042, Jan. 28, 1966, now abandoned, which is a continuation-in-part of application Ser. No. 340,588, Jan. 17, 1964, now abandoned. |

[54] FLUID-DRIVEN ROTARY WING AIRCRAFT
27 Claims, 30 Drawing Figs.

| [52] | U.S. Cl. | 244/17.19 |
|---|---|---|
| [51] | Int. Cl. | B64c 27/18 |
| [50] | Field of Search | 244/17.11, 17.17, 17.19, 17.21, 17.23, 7, 4 |

[56] References Cited
UNITED STATES PATENTS

| 1,848,389 | 3/1932 | Sikorsky | 244/17.11 UX |
| 2,405,244 | 8/1946 | Stanely | 244/17.21 |
| 2,551,455 | 5/1951 | Neale | 244/17.11 |
| 3,126,966 | 3/1964 | Agamian | 244/17.19 X |
| 3,153,521 | 10/1964 | Laufer et al. | 244/17.11 |
| 3,189,302 | 6/1965 | Bullinger | 244/17.21 |
| 3,220,670 | 11/1965 | Fuller | 244/17.17 |

FOREIGN PATENTS

| 770,026 | 3/1957 | Great Britain | 244/17.19 |
| 802,280 | 10/1958 | Great Britain | 244/17.11 |
| 545,118 | 6/1956 | Italy | 244/17.19 |
| 607,627 | 8/1960 | Italy | 244/17.21 |

OTHER REFERENCES

"Jane's All The World 3 Aircraft" Bensen Aircraft Corp. 1965–1966 Edition. Pages 190–191 Relied on.

*Primary Examiner*—Milton Buchler
*Assistant Examiner*—Paul E. Sauberer
*Attorney*—Nolte and Nolte ABSTRACT: A rotary wing aircraft which operates during takeoff and landing as a conventional helicopter employing the combined outputs of main and auxiliary compressors. When the aircraft is lifted vertically to the selected altitude the same may be propelled in forward flight in the manner of an autogyro by disconnecting the rotor compressor drive means and connecting the propeller to the output of the reciprocating engine. The aircraft is further provided with wing thrust augmenting devices, and flap means for increasing the lift forces at lower rotational speeds.

The aircraft can also be manufactured from a standard propeller-driven commercial monoplane in which the wing is taken off and a compact compressor installed on the same mounting points of the fuselage as the wing that was removed, and installing a fluid-driven rotary wing that is connected to the compressor.

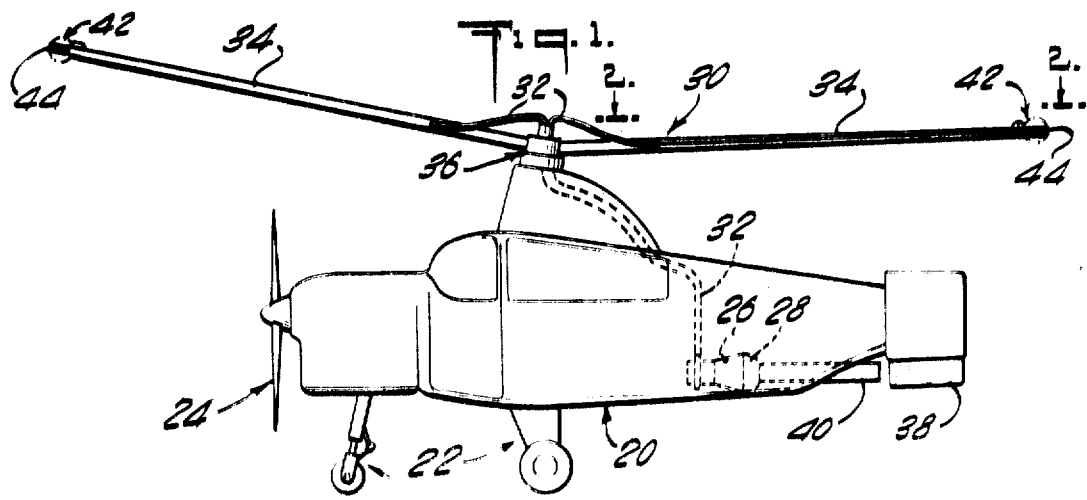
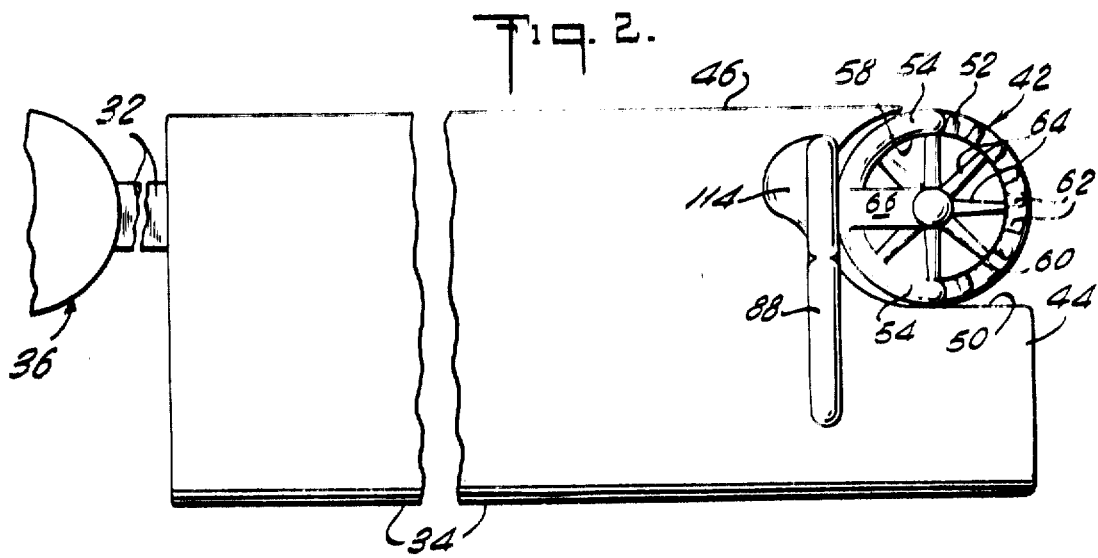
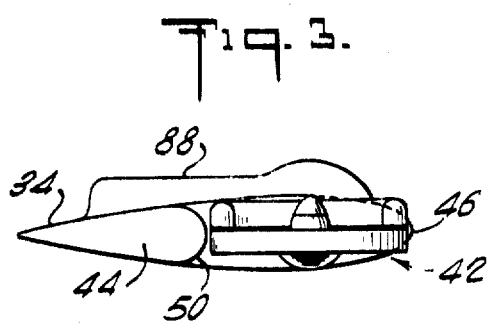
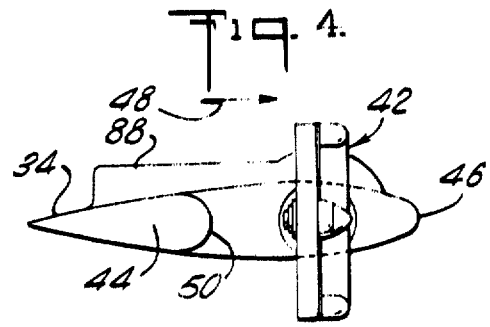

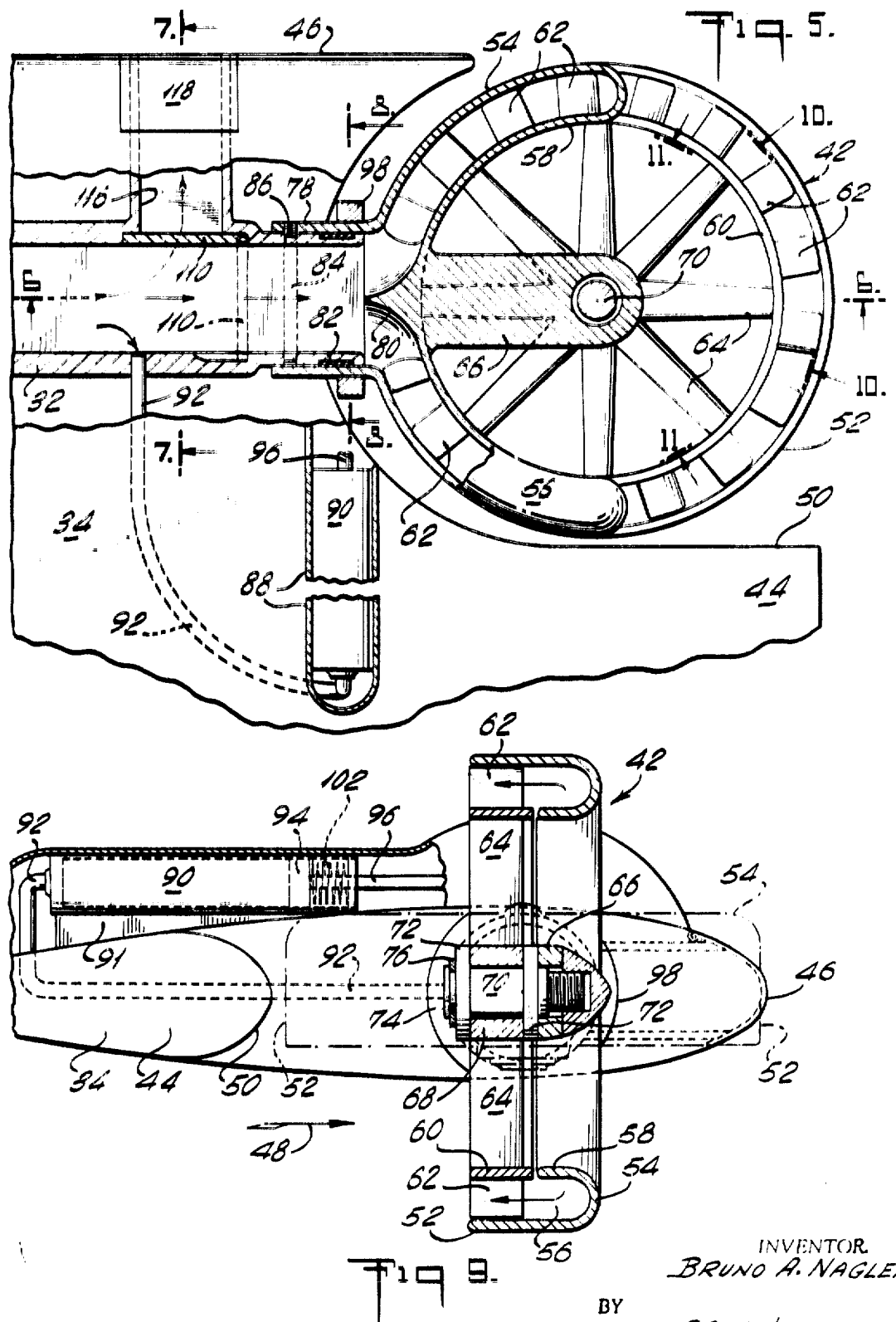

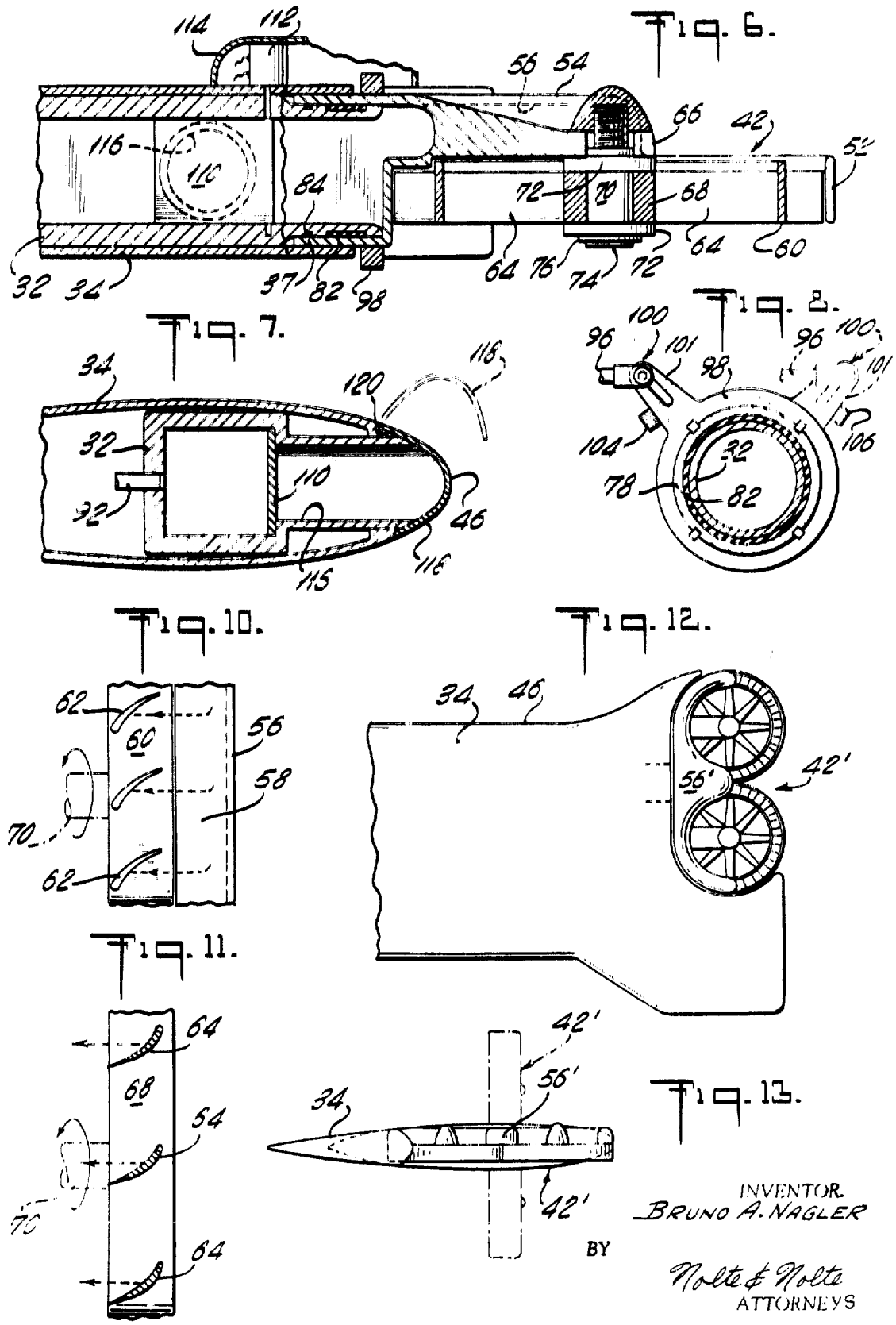

INVENTOR
BRUNO A. NAGLER
BY
Nolte & Nolte
ATTORNEYS

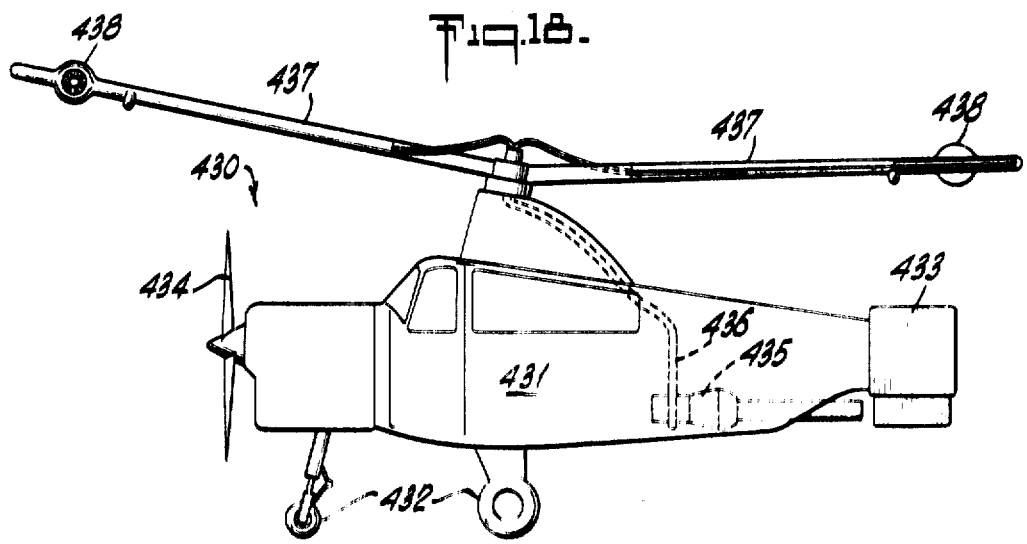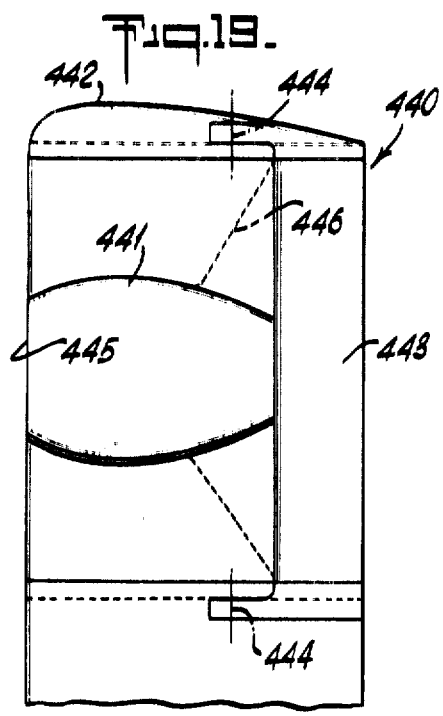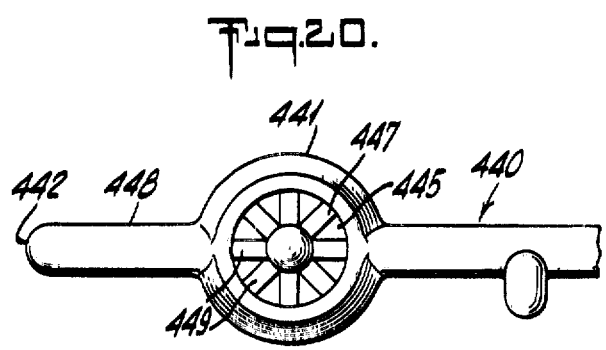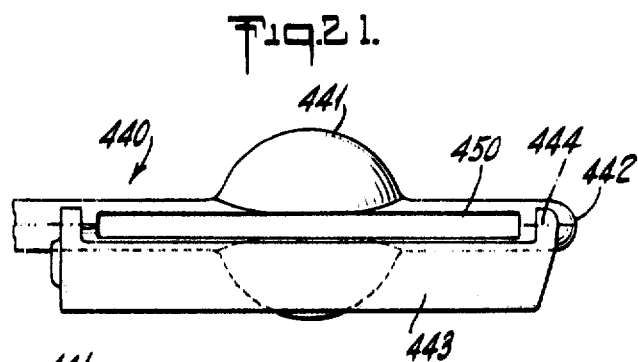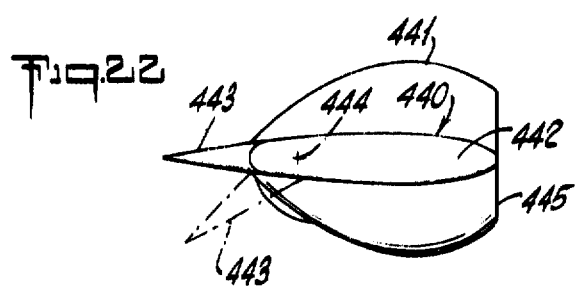

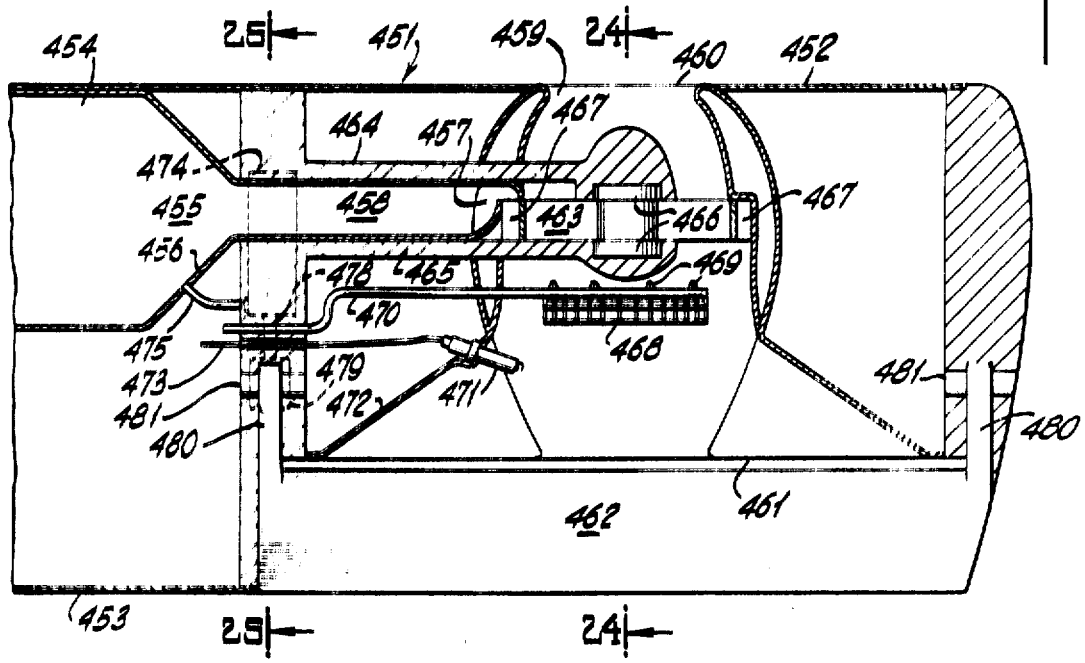
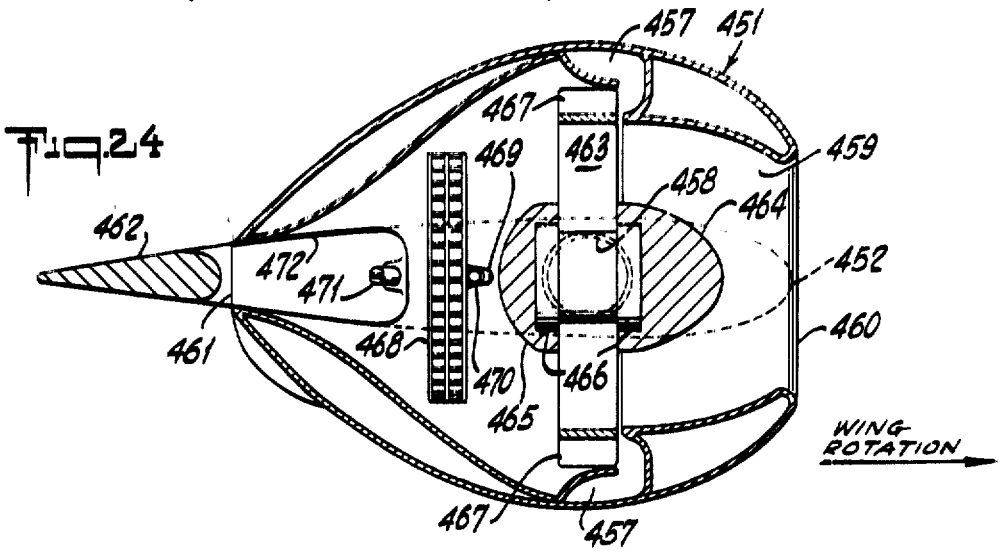
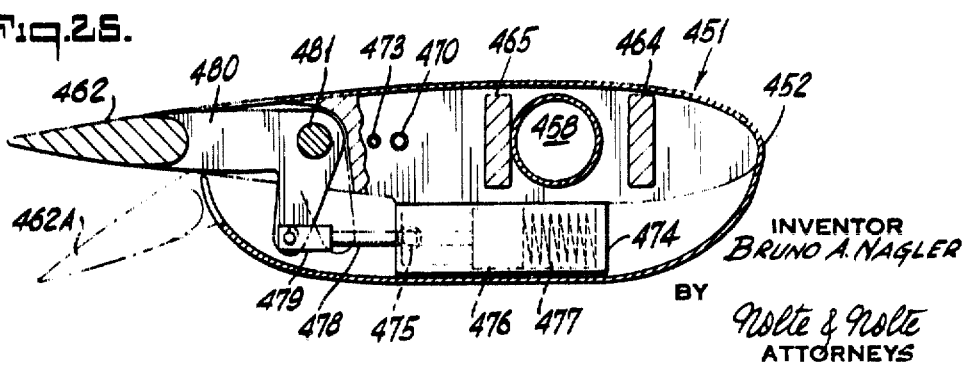

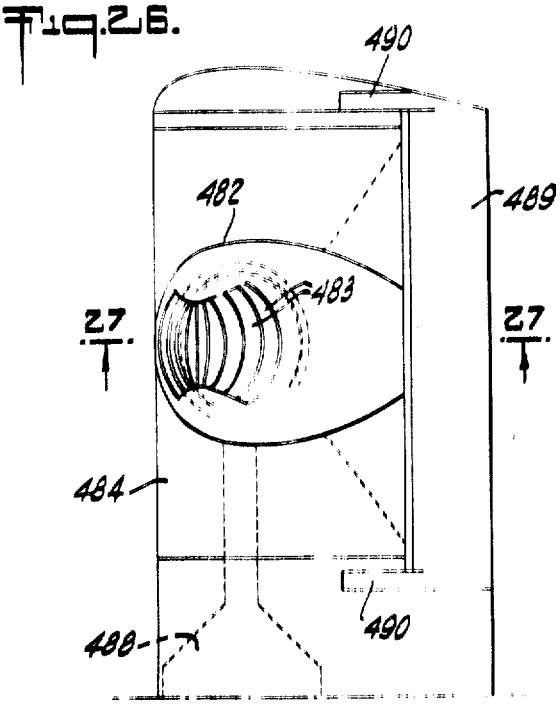
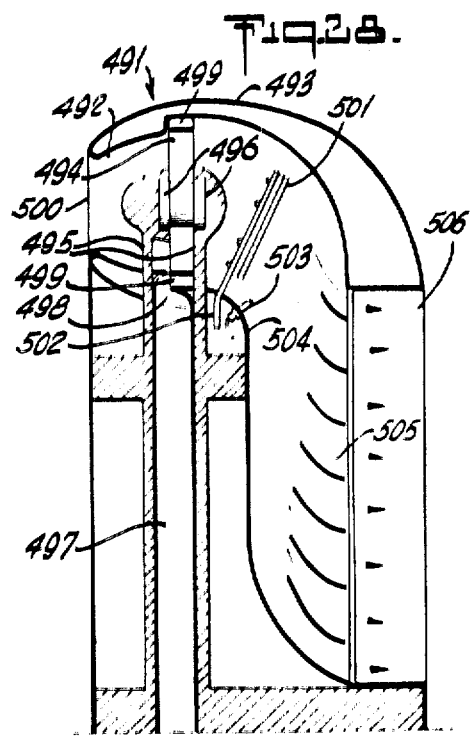
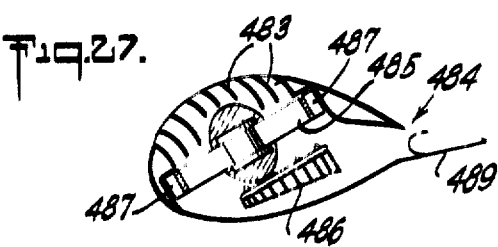
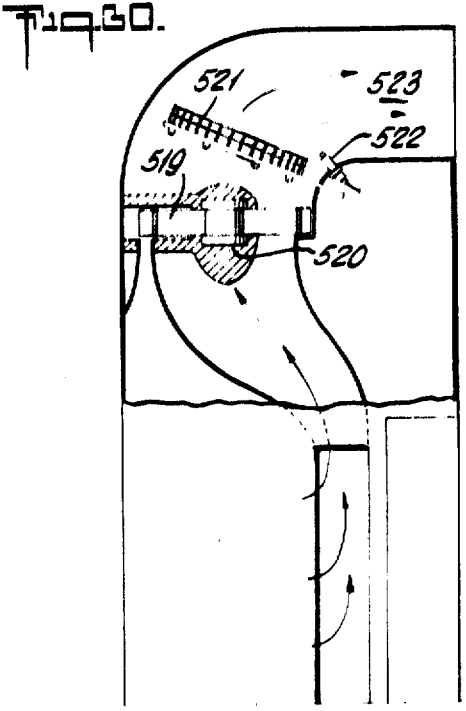
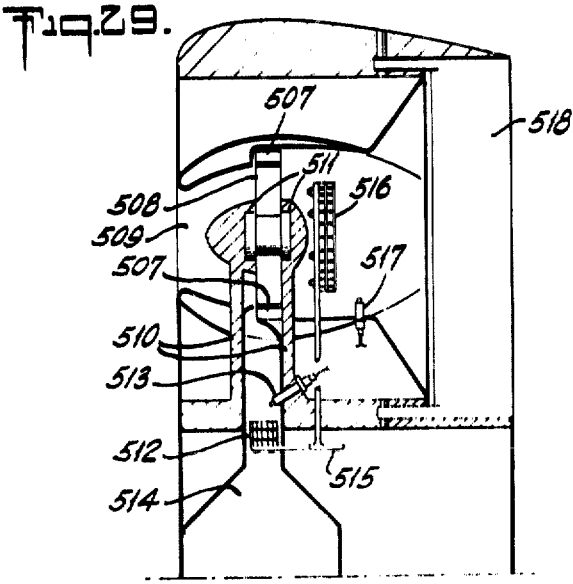

FLUID-DRIVEN ROTARY WING AIRCRAFT

This application is a continuation-in-part of Ser. NO. 600,702, filed Dec. 9, 1966 now abandoned, which is a continuation-in-part of Ser. No. 532,042, filed Jan. 28, 1966, now abandoned, and which is a continuation-in-part of Ser. No. 340,588, filed Jan. 17, 1964, now abandoned.

BACKGROUND OF THE INVENTION

It has already been proposed to direct jets out through tip portions of the wings of a rotary wing assembly for rotating the rotary wing assembly of a rotary winged aircraft. Such rotary wing assemblies are particularly adapted to be used in autogyros, where the rotary wing assemblies are used for lifting the aircraft substantially vertically from the ground. When the desired height is attained, the drive to the rotary wing assembly is terminated and a drive is transmitted instead to a propeller at the nose of the aircraft so that in this way the aircraft will be transported forwardly.

According to one aspect of the present invention a primary standard reciprocating engine is arranged to drive a conventional propeller for forward propulsion as well as to drive a compressor to deliver fluid under pressure to the nozzles of jets located at the tips of the rotary wing, through appropriate ducts and valve arrangements. In addition, a secondary engine is utilized to drive an auxiliary compressor which delivers additional fluid under pressure through appropriate ducts and valves. The cost of the auxiliary compressor unit and its associated maintenance is more than offset by the savings effected by the reduced insurance rates for multiengine aircraft. The auxiliary compressor unit is sized to supply roughly half the horsepower output as that required for hovering but sufficient horsepower to permit limited horizontal flight at reduced speed in emergencies should the primary reciprocating engine fail. The output of both compressors may be combined to lift the aircraft vertically off the ground and into the air when it is loaded beyond the capability or the primary engine, although the primary engine alone delivers sufficient output to lift a normal load. However, in the event of the failure of the main compressor or propulsion engine, the auxiliary compressor delivers sufficient output to propel the aircraft forward, when the pitch of the rotor blades is adjusted to the appropriate angle. Thus, the partially disabled aircraft can reach a suitable landing area safely, powered by the auxiliary compressor alone.

With this arrangement the aircraft may operate during takeoff and landing as a conventional helicopter employing the combined outputs of the main and auxiliary compressors. Thereafter, transition to an autogyro cruise mode of forward flight is effected by disengaging the rotor compressor drive means and connecting the propeller to the output of the reciprocating engine.

Structures of this type while very safe nevertheless are relatively inefficient. There is a considerable waste of power involved simply in the use of jets at the outer tips of the wings of the rotary wing assembly. Turning the wing assembly only by reaction to jets at the wing tips is highly inefficient.

It is, therefore, an object of the present invention to provide a jet-propelled rotary wing aircraft having a main and auxiliary compressor, acting independently of each other for delivering fluid to the rotary wing jets.

It is another object of the present invention to provide an auxiliary compressor which alone has sufficient output to sustain the aircraft in the air and propel it in a horizontal direction.

It is still another object of the present invention to provide a twin engine helicopter capable of employing one of said engines for forward thrust in an autogyro mode of operation, while maintaining the other engine in reserve for limited emergency helicopter operation should the first engine fail.

It is also a primary object of the present invention to provide a rotary wing aircraft which will have a far greater efficiency than an aircraft of the type referred to above.

Another object of the present invention is to provide a rotary wing aircraft utilizing a single forward engine capable of driving a forward propeller and rotary wing means.

A still further object is to provide a rotary wing aircraft having flap means capable of increasing lift forces at lower rotational speeds.

An important object of the present invention is to provide augmenting means for increasing thrust, and at the same time capable of decreasing drag.

Another object is to provide wing and augmentation structures capable of bettering flight characteristics.

Still another object of the present invention is to provide a rotary wing aircraft with a structure which will brake the rotation of the wings of the rotary wing assembly.

Also, it is an object of the present invention to use the structure which drives the wings of the rotary wing assembly also for the purpose of at least partly contributing to the braking of the rotation of the wings of the rotary wing assembly.

Also, it is an object of the present invention to take advantage of the structure for driving the rotary wing assembly in order to stabilize the aircraft while it is in flight.

Yet another object of the present invention is to provide a structure of the above type which will respond automatically to delivery of compressed fluid to conduits in the wings of the rotary aircraft for automatically placing the structure which rotates the wings in an operative position for driving the wings.

Also, it is an object of the present invention to provide a structure which, while capable of accomplishing all of the above objects, nevertheless is composed of simple, rugged elements which are very reliable in operation and which are relatively inexpensive to manufacture and assemble.

One of the primary features of the present invention is to provide, at or near the outer tips of the wings of the rotary wing assembly, thrust augmenters formed by rotary blade assemblies which are driven by jets of compressed fluid for the purpose of rotating the wings of the rotary wing assembly, and it has been found that if the jets are used to drive the wings by way of such thrust augmenters, a far greater efficiency is obtained than if the wings are driven simply by the reaction to jets issuing from the outer tips of the wings.

In one or more embodiments of the present invention a wing structure and thrust augmentation structure are provided whereby a pivotally mounted fan or rotary blade assembly may be moved between a rest position and an operating position. In the rest position, the augmenting means is located substantially in the same plane as the wing to which it is secured. In the operating position, the augmenting means extends out of the plane of the wing.

In still further embodiments of the present invention, thrust augmentation by means of rotary blade means is accomplished in a manner in which pivoting of the augmenting means is unnecessary. A structure is provided wherein the rotary blade means is secured within a portion of the wing at or near the tip thereof. The drag of the wing assembly may be increased or decreased, as in the case of the pivotally mounted rotary blade assembly, by means of a movable flap which is either located at or becomes part of the trailing edge of the wing.

The invention is illustrated by way of example in accompanying drawings which form part of the present application and in which;

FIG. 1 is a schematic side elevation of an aircraft according to the present invention;

FIG. 2 is a fragmentary top plan of view of one of the wings of the rotary wing assembly, FIG. 2 showing in particular a rotary blade means which is situated at the tip of the wing;

Figure 14:
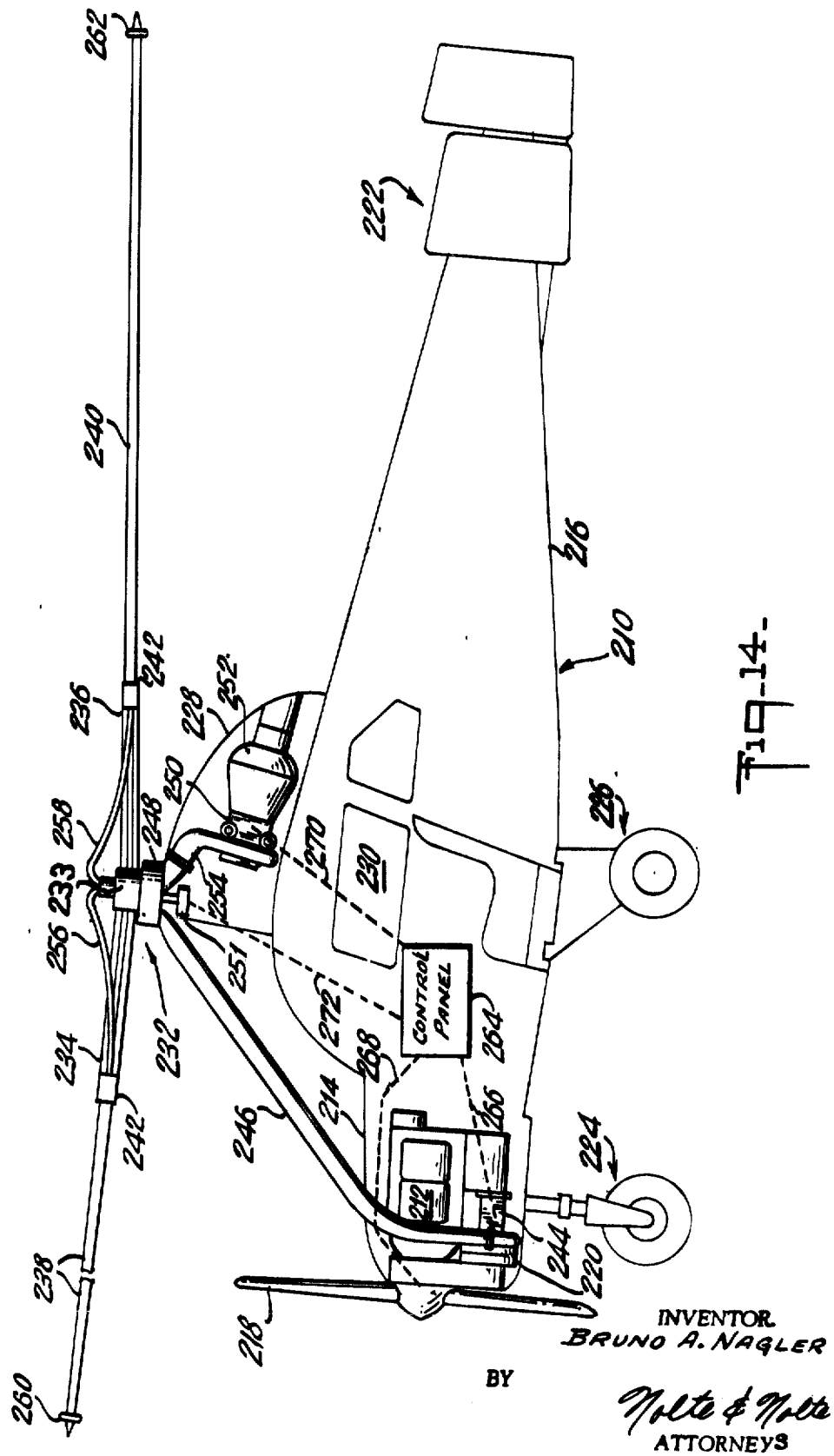
Figure 15:
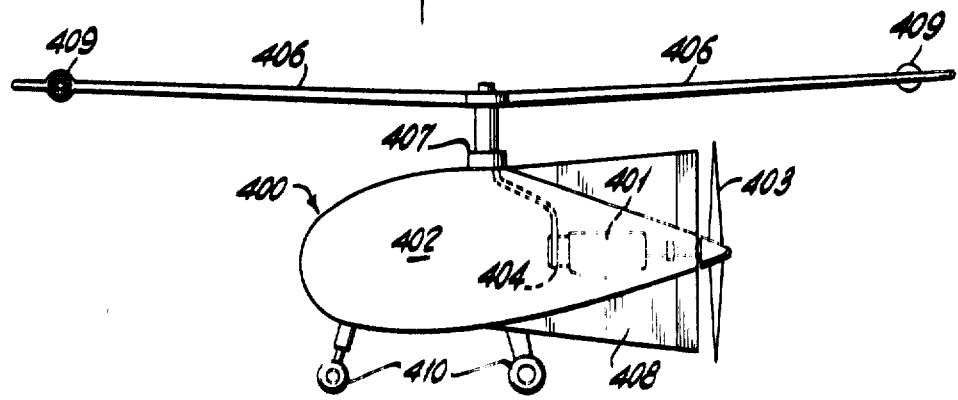
Figure 16:
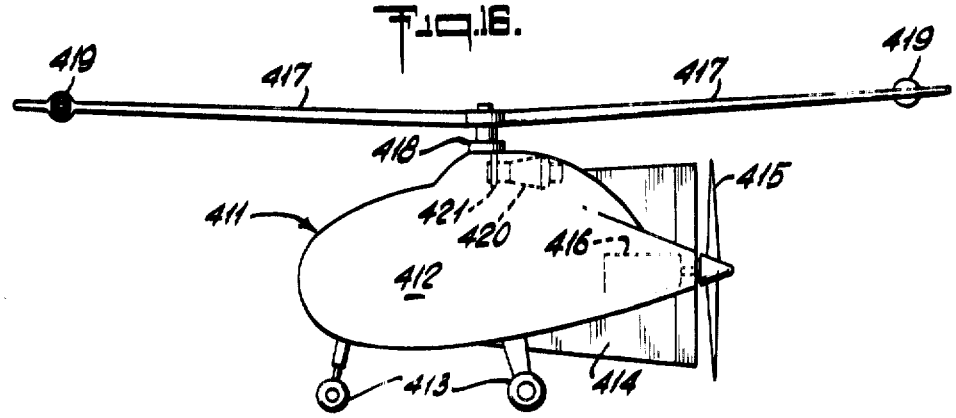
Figure 17:
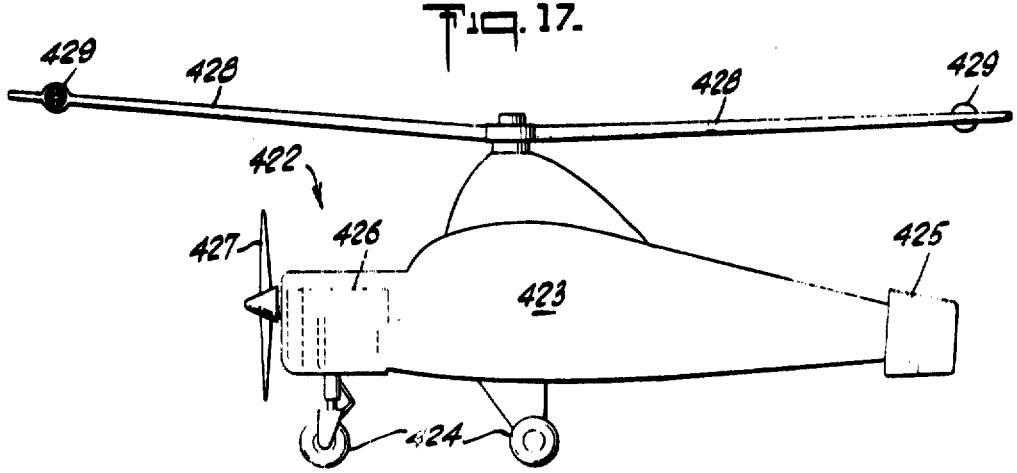

FIG. 3 diagrammatically illustrates the condition of a rotary blade assembly when it is in a rest position;

FIG. 4 shows the structure of FIG. 3 when the rotary blade means has been displaced from the rest position of FIG. 3 into an operating position which is illustrated in FIG. 4;

FIG. 5 is a sectional plan view showing the details of a rotary blade means together with structure which cooperates therewith, FIG. 5 also showing part of the brake means of the invention;

FIG. 6 is a fragmentary sectional elevation taken along the line 6—6 of FIG. 5 in the direction of the arrows;

FIG. 7 is a transverse sectional elevation taken along the line 7—7 of FIG. 5 in the direction of the arrows and showing part of the braking structure of the invention;

FIG. 8 is a transverse sectional elevation taken along the line 8—8 of FIG. 5 in the direction of the arrows and showing part of a linkage for displacing the rotary blade means between its rest and operating positions;

FIG. 9 is a partly sectional side elevation showing the rotary blade means in its operative position and also showing part of the structure for determining the position of the rotary blade means;

FIG. 10 is a fragmentary developed view taken along the line 10—10 of FIG. 5 in the direction of the arrows and showing the structure of outer blades of the rotary blade means together with structure for delivering compressed fluid thereto;

FIG. 11 is a fragmentary developed view taken along the line 11—11 of FIG. 5 in the direction of the arrows and showing the structure of inner blades of the rotary blade means;

FIG. 12 is a schematic top plan view of the outer tip portion of a wing showing another embodiment of a rotary blade means of the invention;

FIG. 13 schematically illustrates in an end view the rotary blade means and wing of FIG. 12 with the rotary blade means shown in solid lines in FIG. 13 in its rest position and in dot-dash lines in its operating position;

FIG. 14 shows schematically an embodiment designed particularly for safety;

FIG. 15 is a schematic elevational view of an embodiment of the present invention utilizing a single engine and having a rear propeller;

FIG. 16 is a schematic elevational view of an embodiment of the present invention similar to that shown in FIG. 15 and having an auxiliary engine;

FIG. 17 is a schematic elevational view of an embodiment in which a single forward engine powers a forward propeller and the rotary wings;

FIG. 18 is a schematic elevational view of another embodiment of the present invention;

FIG. 19 is a fragmentary sectional plan view of one of the wings of the present invention;

FIG. 20 is a fragmentary elevational view of the leading edge of augmenting means according to the present invention;

FIG. 21 is a fragmentary elevational view of the trailing edge and flap arrangement of the augmenting means in accordance with the present invention;

FIG. 22 is a schematic elevational view of the flap arrangement according to the present invention showing a plurality of positions of said flap;

FIG. 23 is a fragmentary sectional plan view of a portion of a rotary wing housing augmenting means according to the present invention;

FIG. 24 is a sectional elevation view taken along the line 24—24 in FIG. 23;

FIG. 25 is a sectional elevation view taken along the line 25—25 of FIG. 23;

FIG. 26 is a fragmentary schematic plan view of a portion of a wing according to the present invention;

FIG. 27 is a sectional elevation view taken along the line 27—27 in FIG. 26;

FIG. 28 is a fragmentary sectional plan view of a portion of a wing housing showing an embodiment of the augmenting means according to the present invention;

FIG. 29 is a fragmentary sectional plan view of a portion of a wing housing showing another embodiment of the augmenting means according to the present invention;

FIG. 30 is a fragmentary sectional plan view of a wing showing another embodiment of augmenting means according to the present invention.

Referring now to FIG. 1 there is shown therein the fuselage of a rotary wing aircraft, this fuselage 20 carrying any suitable landing gear 22 and also carrying at its nose a propeller 24 which is of a conventional construction and which is adapted to be conventionally driven for advancing the aircraft forwardly once it has been lifted to a suitable height. The fuselage 20 carries a compressor 26 which is schematically indicated and which is of a conventional construction, and this compressor 26 is driven by an engine 28 which is also conventional and which may be an entirely separate engine provided for the purpose of driving the compressor 26, although, if desired, the engine which drives the propeller 24 may also be used to drive the compressor 26.

Over the fuselage is located the rotary wing means 30, and a conduit means 32 which extends from and communicates with the compressor 26, this conduit means 32 extending from the fuselage longitudinally along the wings to outer tip portions thereof in order to drive a plurality of rotary blade means referred to below, and forming the thrust augmenters of the present invention. Thus, the conduit means 32 has branches extending longitudinally along the wings 34 in the interior thereof. The rotary wing means 30 has its axis extending downwardly through the fuselage, and of course the wings 34 project outwardly from this axis. A connecting means 36, which may also be conventional connects the rotary wing means 30 to the fuselage 20 for rotary movement with respect thereto about the axis of the rotary wing means 30. This connecting means 36 can include a chamber to which branches, which form part of the conduit means 32, are connected for directing the compressed fluid, which may be air, along the conduit means at the portions thereof located in the wings 34 to the outer tip portions thereof.

In accordance with one of the features of the present invention, the tail portion of the fuselage carries at its underside a stabilizing fin 38 which extends parallel to the axis of the fuselage, and the engine 28 has an exhaust 40 which directs the stream of exhaust gases to the fin 38 so that in this way the fin 38 cooperates with the stream of exhaust gases to contribute to the stabilization of the aircraft.

Referring to FIG. 2, where one of the wings 34 is shown on an enlarged scale as compared to FIG. 1, it will be seen that the outer tip portion 44 of the wing 34 is provided in the region of the leading edge 46 of the wing with a thrust augmenter formed by a rotary blade means 42 the details of which are described below. As may be seen from FIG. 3, the rotary blade means 42 has a rest position where it is located substantially in the same plane as the wing 34 so that this wing 34 will in this case function in a conventional manner, while the rotary blade means 42 is capable of being displaced in a manner described below, from the rest position of FIG. 3 into the operating position of FIG. 4 where the rotary blade means will drive the wing in the direction of the arrow 48 of FIG. 4, and it will also be noted from FIG. 4 that when the rotary blade means 42 is in its operating position it is still located adjacent to the leading edge 46 of the wing. Of course, this construction which is shown in FIGS. 2–4 is duplicated at the outer tip portions 44 of all of the wings 34. It is obvious to one skilled in the art that a prime benefit is derived from being able to reduce drag forces on wings 34 by positioning them as shown in FIG. 3.

Referring now to FIG. 5, where the details of one possible embodiment of a thrust augmenter according to the present invention are illustrated, it will be seen collars 72 may instead take the form of simple rings which freely surround the bolt 70. The head end 74 of the bolt 70 engages a washer 76 situated between the head end 74 and the left ring 72, as viewed in FIG. 9. In this way the hub 68 together with the inner blades 64 are supported for rotation about the axis of the inner ring 60 which of course rotates with the inner blades 64 and which carries the outer blades 62 for rotary movement with the ring 60. The outer ring 52 of course does not rotate and is formed integrally with the channel 56, as pointed out above.

At its left end, as viewed in FIG. 5, the outer ring 52 together with the integral outer wall of the channel 56 are formed integrally with a tubular extension 78 which extends over the free end of the conduit means 32 in the manner shown most clearly in FIG. 5, and in alignment with the free end of the conduit 32 there is situated within the channel 56 a fluid deflector 80 formed integrally with the inner wall 58 and having the configuration shown most clearly in FIG. 5 so that the fluid flowing to the channel 56 will be deflected to the portions of the channel which are located on each side of the deflector 80. It will be noted that each of these portions extend through approximately 90° so that the channel 56 itself extends through approximately 180° about the axis of the rotary blade means 42. The sealing ring 82 is located in a groove formed at the exterior surface of the free end portion of the conduit 32 so that the free end portion of the conduit 32 forms a fluidtight support means supporting the rotary blade means 42 for turning movement about an axis which extends longitudinally of the wing 34, and it is about this axis that the rotary blade means 42 turns between the rest position of FIG. 3 and the operating position of FIG. 4. The support means, connected to the free end portion of the conduit means 32 in FIG. 5, is formed at its exterior with an annular groove 84 receiving the free ends of one or more pins 86 carried by the tubular portion 78 of the rotary blade means 42, and these pins 86 may also take the form of set screws which extend into the groove 84 but do not constrain the rotary blade means 42 against rotation about the axis of the tubular portion 78, so that in this way while the rotary blade means 42 can turn about this latter axis it cannot move axially away from the conduit means 32.

As was indicated above, a positioning means is provided for each thrust augmenter or rotary blade means 42 in order to displace the rotary blade means between the positions shown in FIGS. 3 and 4, and this positioning means for each rotary blade means takes the form of a turning means for turning the rotary blade means in its entirety between the positions shown in FIG. 3 and 4. The details of this turning means are illustrated in FIGS. 5, 8 and 9, and it is again pointed out that the turning means for any rotary blade means is identical with that used with the others so that only one assembly is described and shown in detail. Referring to FIG. 9 it will be seen that the wings 34 carries at its upper surface an elongated housing 88 which may be removably connected to the wing in any suitable way, and within the housing 88 is located a cylinder 90 which is fixedly mounted on the wing by way of a bracket 91, as shown diagrammatically in FIG. 9. A conduit 92 communicates with the interior of the cylinder 90 at its left end, as viewed in FIG. 9, and this conduit 92 also communicates with the interior of the conduit means 32 in the manner shown most clearly in FIG. 5. Within the cylinder 90 is located a piston 94 which slidably engages the inner surface of the cylinder 90 in a fluidtight manner, and the piston rod 96 extends outwardly beyond the cylinder 90 toward the leading edge 46 of the wing. Referring to FIG. 8, it will be seen that the piston rod forms part of a linkage for connecting the piston 94 to the rotary blade means 42. Thus, the piston rod 96 has a pin-and-slot connection 100 with a ring 98 which is keyed to tubular portion 78 of the rotary blade means 42, as indicated in FIG. 8, although the ring 98 may also have a splined connection with the tubular portion 78, so that as a result, as the piston rod is advanced between the solid and dot-dash positions indicated in FIG. 8, the tubular portion 78 will necessarily turn through 90° to displace the entire rotary blade means 42 between the positions indicated in FIGS. 3 and 4. The rotary blade means 42 is shown in FIG. 9 in the same position that it has in FIG. 4, and it will be noted that FIG. 9 shows the piston 94 displaced so that it is located adjacent to the right end of the cylinder 90. As is apparent from FIG. 8, the pin-and-slot connection is joined to a radial extension 101 of the ring 98 which is formed with the slot and which receives a pin which is fixed to the end of the piston rod 96. Referring to FIG. 9, it will be seen that there is housed within the cylinder 90, between its right end wall and the piston 94, a coil spring 102 which is compressed beyond its initial compression when the piston 94 is displaced to the position indicated in FIG. 9. This displacement of the piston 94 in opposition to the spring 102 takes place as the result of the fluid under pressure in the conduit means 32, since part of this fluid under pressure is free to enter into the conduit 92 and flow into the cylinder 90 for displacing the piston 94 to the position indicated in FIG. 9. When the flow of fluid in the conduit means is terminated the spring 102 will be free to expand because of the drop of pressure and will displace the piston 94 back to its initial position pulling the piston rod 96 back into the cylinder 90 so that the linkage shown in FIG. 8 will return the ring 98 to its solid line position indicated in FIG. 8 which corresponds to the position of the rotary blade means which is indicated in FIG. 3. Any suitable stop means, which may be adjustable, may be provided to determine the end positions of the thrust augmenter 42, and there is indicated diagrammatically in FIG. 8 a pair of stop members 104 and 106 which cooperate with the extension 100 to determine the rest and operating positions of the rotary blade means, and these stop members 104 and 106 may be mounted within the housing 88 on suitable brackets and may be adjustable as by taking the form of nuts or bolt heads which are connected to threaded shanks mounted in suitable slots of the brackets so that they can be shifted and then fixed by a lock nut arrangement or the like in an adjusted position so that in this way it is possible to determine the end positions of the ring 98 and thus precisely determine the positions of the rotary blade means 42, as indicated in FIGS. 3 and 4.

Thus, when the rotary wing assembly is not driven, the spring 102 will automatically maintain the thrust augmenter 42 in the position indicated in FIG. 3. However, when it is desired to provide lift to the aircraft by way of the rotary wing means 30, the operator will of course initiate the drive of compressor 26 so that the compressed fluid will flow through the conduit means 32 to the channels 56 of the several rotary blade means 42, and the pressure of the compressed fluid which enters into the conduits 92 of each turning means will displace the pistons 94 into the positions indicated in FIG. 9 so that the rotary blade means 42 will be automatically displaced to the position indicated in FIG. 9. The compressed fluid enters into the channel 56 and acts on the blades 62 in the manner indicated in FIG. 10 which diagrammatically indicates how the compressed fluid flows axially from the channel 56 against the blades 62 so as to turn the rings and blades of the rotary blade means. FIG. 11 illustrates how the inner blades 64 cooperate with the surrounding air, in response to rotation derived from the blades 62, in order to propel the rotary wing means around its axis.

Another embodiment of the thrust augmenter is illustrated in FIGS. 12 and 13. Thus, referring to FIGS. 12 and 13 it will be seen that the rotary blade means 42' may take the form of a pair of blade assemblies as described above but each being of a smaller diameter and of a smaller depth, and except for this difference in size each of the blade assemblies shown in FIGS. 12 and 13 is identical with that described above. However, the channel 56' of FIGS. 12 and 13 is of course different from the channel 56 described above. The channel 56' has a tubular extension for supporting the rotary blade means 42' on the support means formed by the free end portion of the conduit 32 in the manner described above, and it is turned in precisely the same way between the solid and dot-dash line positions indicated in FIG. 13. Portions of the outer ring of each blade assembly are integral with the outer wall of the channel 56' which has the configuration shown in FIG. 12, and portions of the inner wall of the channel are integral with the supports for the pair of rotary blade assemblies, as is also indicated in FIG. 12. Within the hollow interior of the channel 56', midway between the pair of rotary blade assemblies shown in FIG. 12, the channel has a deflector similar to the deflector 80 described above for dividing the stream of compressed fluid so that it is split substantially evenly between the pair of rotary blade assemblies and it will be noted that the channel 56' extends through approximately 180° about the periphery of each rotary blade assembly. These are the only differences between the embodiment of FIGS. 12 and 13 and the embodiment which is shown in FIGS. 3 and 4. Of course, with the embodiment of FIGS. 3 and 4 it will be seen that the central portion of the rotary blade means 42 is situated directly in the plane of the wing when the rotary blade means 42 has the position indicated in FIG. 4, so that some of the air stream generated by the rotary blade means 42 will necessarily be deflected by surfaces of the wing 34, while with the embodiment of FIGS. 12 and 13, as shown in dot-dash lines in FIG. 13, there are a pair of rotary blade assemblies one of which is located almost entirely above and the other which is located almost entirely below the wing so that with this arrangement the rotary blade assemblies of each rotary blade means 42' is exposed to a substantially greater extent to the outer air and the operation thereof is not interfered with by the wing to the extent of the embodiment of FIGS. 3 and 4. However, this latter embodiment is simpler and somewhat more rugged, so that each of the embodiments has its own advantages.

With the structure as described above it is possible, in order to lift the aircraft, to take fluid under pressure from the compressor and deliver it to the plurality of thrust augmenters which are at the tips of the wings. As soon as the compressed fluid reaches the rotary blade means 42 the latter will be driven, and of course the compressed fluid which enters through the conduit 92 into the cylinder 90 of the turning means will automatically turn the rotary blade means to its operating position for driving the wing. Then, when the desired height of the aircraft is attained and it is desired to advance forwardly by way of the propeller 24, the compressor 26 will of course be stopped by the operator, so that delivery of fluid under pressure to the rotary blade means 42 will be terminated and it will automatically return to its rest position under the action of the spring 102, as described above.

When the aircraft has just landed it is desirable to quickly terminate the rotation of the wings, and in accordance with a further feature of the invention, there is provided a brake means which will brake the rotation of the rotary wing means 30. It will be seen that this brake means of the invention uses the compressed fluid of the compressor 26, as well as the thrust augmenter 42 itself, so that very little additional structure is required for the brake means of the invention.

The operation of the brake means of the invention is controlled by a valve means which includes a valve plate 110, shown in FIG. 5 in solid lines in its open position and in dotted lines in its closed position. This valve plate 110 is hinged at its right edge, as viewed in FIG. 5, to the conduit 32 so that it can turn about its right edge between the closed and open positions indicated in FIG. 5. As may be seen from FIG. 7 the conduit 32 has a substantially square cross section, at least at the region where the valve plate 110 is located, and, as may be seen from FIG. 6, the pin which carries the valve plate is supported for turning movement in the conduit 32 in suitable bores thereof, and this pin is fixed to the valve plate 110 and is controlled by a solenoid 112 which can be energized and deenergized by the operator through a suitable electrical circuit with a switch available to the operator at the control panel. This solenoid 112 is housed within an extension 114 of the housing 88, this extension 114 being visible in FIG. 2. An illustrated spring maintains the plate 110 in the open, solid line position indicated in FIG. 5 when the solenoid 112 is not energized, and it will be seen that at this time the valve plate 110 simply forms a a portion of the inner surface of the conduit means 32 so that the compressed fluid will flow without any interference to the thrust augmenter 42 in the open position of the valve means. When it is desired to brake the rotation of the wings, when the aircraft is on the ground the operator will energize the solenoid 112 so that the valve plate 110 will turn to its closed position, shown in dotted lines in FIG. 5, and in this position the flow of compressed air to the rotary blade means 42 will be interrupted.

The brake means includes a branch conduit 116 which communicates with the conduit 32 and which leads therefrom to the leading edge 46 of the wing where the branch conduit 116 is closed by a flap 118 which is hinged at 120, at the upper edge of the flap 118, to the wing and which is urged by an unillustrated spring, if desired, to the closed position shown in solid lines in FIG. 7. Actually the flap 118 will drop due to its own weight to the closed position shown in FIG. 7, so that such a spring in practice can be omitted. Assuming now that it is desired to brake the rotation of the wings the operator will simply energize the solenoid 112 so as to displace the valve to its closed position where it will cut off the flow of compressed fluid to the thrust augmenter 42, and in this closed position of the valve the branch conduit 116 is open and the valve plate 110 itself contributes to the deflection of the compressed fluid through the branch conduit 116 to the leading edge 46 of the wing. After energizing the solenoid 112, the operator starts the compressor 26 so that compressed fluid now flows in conduit means 32. The pressure of the fluid itself will lift the flap 118 to the open, dot-dash line position indicated in FIG. 7, so that at this time the compressed fluid will issue at the leading edge of each wing adjacent to its outer extremity, and the result will be of course that the reaction to the jet of fluid issuing from the leading edge will sharply brake the rotation of the rotary wings.

In addition, it is to be noted, as is shown most clearly in FIG. 5, that in accordance with a further feature of the invention the conduit 92 communicates with a part of the conduit 32 which is upstream of the valve plate 110 when the latter is in its closed position. In other words when it is desired to brake the rotation of the wings the conduit 92 is still maintained in communication with the compressed fluid so that the thrust augmenter 42 will assume its operating position, and as a result of this feature the thrust augmenter itself contributes to the braking of the wings since it will provide a drag on the rotation of the rotary wings and in this way will also contribute to some extent to the braking of the rotation of the rotary wings. When the rotation of the rotary wing means 30 has been braked to a sufficient extent the operator will terminate the operation of the compressor 26 and will also deenergize the solenoid 112 so that the valve 110 will return to its open position and, of course, since the compressor has stopped operating there will be no more delivery of compressed fluid to the thrust augmenters 42 and the springs 102 will return them to their rest position.

The use of thrust augmenters 42 or 42' at the outer tip portions of the wings 34 of the rotary wing means 30 in the manner described above has been found in practice to be far more efficient than simply driving the wings by the reaction to jets of compressed fluid which issue from the tips of the wings.

Referring now to FIG. 14, numeral 210 indicates a rotary wing aircraft, substantially as shown.

A conventional forward propulsion engine 212 is suitably mounted in the nose 214 of the aircraft, within fuselage 216. The forward propulsion engine 212 serves to drive the propeller 218 by appropriate means (not shown). Propeller 218 is preferably a variable pitch propeller whose pitch may be reduced to zero during the helicopter takeoff mode, thereby transferring substantially all of the engine's output through clutch 220 to compressor 244. Alternately, a clutch (not shown) may be utilized to disengage the propeller from the engine, again providing for the transfer of substantially all of the engine's output to the compressor. In the latter case a means must be provided to account for the lost flywheel effect which the zero-adjusted propeller supplies in the first and preferable embodiment. A tail assembly 222 provides the pilot with additional control of the aircraft through connecting apparatus (not shown). Conventional landing gear assemblies 224 and 226 provide the necessary cushioning mechanism upon which the aircraft may rest when the plane is on the ground.

Structure, indicated by 228 located above cabin 230, serves to support the rotor assembly 232. A rotor hub box 233 sustains the rotor wing holder units 234 and 236. Rotary wings 238 and 240 are connected, respectively, to the units 234 and 236 through couplers 242. Suitable swash plate apparatus 251 and controls (not shown in detail) allow the pitch of the wings to be varied during their rotation to provide normal helicopter operation. Box 233 also includes mechanism for locking the pitch of the wings so that it remains constant during the aircraft's operation in the autogyro mode.

A main compressor 244, driven by the forward propulsion engine 212 through clutch 220 exhausts compressed fluid into duct 246. An auxiliary compressor 250 is driven by a secondary engine 252. The output of the auxiliary compressor is substantially less than that of the output of the main compressor, it only being designed to provide additional power should it be necessary during the takeoff helicopter mode of operation and emergency power should the primary engine malfunction during the autogyro cruise mode. The fluid from the auxiliary compressor is delivered into duct 254.

The compressed fluid from conduits 256 and 254 is combined in plenum chamber 248 and directed to the rotating conduits 256 and 258. The conduits 256 and 258 pass, respectively, into wings 238 and 240, and thence to the tip jet nozzles 260 and 262. The outputs of both compressors, therefore, flow into a common mixing chamber 248 from which the fluid conducted thereto is passed out to the jet nozzles. The passage of the compressed fluid through the nozzles 260 and 262 and the reaction thereto may serve to rotate wings 238 and 240. The use of thrust augmenters is of course preferred. Since the outputs of both compressors lead into the common mixing chamber 248, it can be understood that either or both of the outputs may supply the fluid to both jet nozzles by a suitable arrangement of valves (not shown).

A control panel 264 is conveniently positioned inside the cabin 230 within reach of the pilot. Panel 264 includes control apparatus represented by dotted lines 266, 268 and 270 and 272 which allow the operator of the aircraft to engage the compressor 244, adjust the pitch of propeller 218, actuate the auxiliary compressor 250, and vary or lock the pitch of the rotor blades 238 and 240.

Turning now to the operation of the apparatus of FIG. 14, when the aircraft is ready to take off from the ground the pilot first adjusts the pitch of propeller 218 to zero. The engine 212, and if need be, engine 252, is then actuated and the compressor 244 and, if engine 252 is employed, compressor 250 becomes operative. The compressors provide sufficient fluid output to chamber 248 and through conduits 256 and 258 to the jet nozzles to rotate the wings and raise the aircraft into the air.

After the aircraft has attained sufficient altitude and the cruising mode is desired, the pilot varies the pitch of the propeller 218 to from zero to that which will provide the required forward propulsion of the aircraft. The pilot then shuts off the secondary engine 252, if employed during takeoff, and disengages clutch 220 so that the entire output of engine 212 is directed to the propeller 218, and neither compressor is delivering compressed fluid to the jet nozzles. The propeller now propels the aircraft forward while wings 238 and 240 autorotate in the conventional locked pitch manner.

Referring now to FIGS. 15–18, it is within the proper scope of the present invention to include various combinations of the herein described novel elements of the invention. FIG. 15 shows a preferred embodiment of the present invention in which a single engine 401 is disposed within fuselage 402 of aircraft 400, engine 401 driving propeller 403 as well as a compressor 404. The compressor transmits the compressed fluid through a duct 405 which extends from compressor 404 to rotary wings 406. The wings are connected to fuselage 402 by desired conventional rotary connecting means 407. A stabilizing fin 408 is suitably mounted at the rear end of the fuselage.

At or near the tips of wings 406, thrust-augmenting means 409 are mounted in a fixed manner to be later described. Suitable landing gear 410 accommodates fuselage 402. Thus, in the embodiment shown in FIG. 18, power for both vertical and forward movement is supplied by a single engine 401 which is of such a predetermined size and capacity as to accommodate all load conditions. With this embodiment, the obvious decrease in structural and material costs and maintenance is noted and its use becomes feasible in applications in which insurance rates will not become prohibitive. Furthermore, with propeller 403 in the rear of the aircraft 400, visibility is greatly enhanced, rendering this model of particular value in military operations.

FIG. 16 illustrates an embodiment of the present invention wherein aircraft 411 is shown having a fuselage 412, suitable landing gear 413 and a stabilizing fin 414 at the rear of the fuselage. A propeller 415 of conventional construction is mounted in the rear of aircraft 411. Engine 416 is suitably mounted within fuselage 412 to drive propeller 415.

Rotary wings 417 are suitably connected to fuselage 412 by connecting means 418. Thrust augmenting means 419 are secured to wings 417 at or near the tips thereof and in a manner to be later described. An engine 420 drives compressor 421, both of which are located within the upper portion of fuselage 412. Ducts (not shown) within wings 417 communicate with conduits leading to compressor 421 such that the compressor transmits compressed fluid therethrough.

Aircraft 411, having two separate engines has the advantage of lower insurance rates. Both aircraft 400 and 411 have the type of fixed thrust augmenting means to be later described in more detail.

FIG. 17 illustrates aircraft 422 having a fuselage 423, landing gear 424 and a stabilizing fin 425. In this embodiment of the present invention a single engine 426 located in the forward part of the fuselage drives propeller 427 and rotary wings 428. Thrust augmenting means 429 are disposed at or near the tips of rotary wings 428. Compressor means and ducts (not shown) within wings 428 provide the means whereby compressed fluid drives the rotary wings.

Referring now to FIG. 18, aircraft 430 has a fuselage 431, suitable landing gear 432 and stabilizing means 433 at the rear of fuselage 431. In this embodiment, a forward propeller 434 is driven by a primary engine, while a secondary engine drives compressor 435 which, in turn, compresses fluid and forces the compressed fluid through duct 436 and into ducts within rotary wings 437. These ducts which communicate with duct 436 also communicate with thrust augmenting means 438 located at or near the tips of rotary wings 437.

Thus it is seen in FIGS. 15–18 that either a single engine or the combination of a primary and auxiliary engine may be used to drive both a propeller and the rotary wings of such an aircraft. It is contemplated by the present invention, as seen in FIGS. 15–18 that such propeller be located either forward or to the rear of the fuselage. It is also contemplated by the present invention that a single engine drive both a propeller and rotary wings wherein said single engine is located at the rotor portion of the rotary wings in the fuselage.

Referring now in more detail to the thrust augmenting means associated with aircraft such as 400, 411, 422, and 430 (FIGS. 15–18), FIG. 19 shows the disposition of the associated apparatus with respect to the rotary wing 440. Chamber 441 is situated within wing 440 near the tip 442 thereof. A flap 443 is pivotally mounted to wing 440 about flap axis 444. Thus, when desired, air is able to enter opening 445 which communicates with chamber 441 and fluid possessing predetermined and selected properties may exit from diverging portion 446 (shown by dotted line).

Disposed within chamber 441 is a fan wheel 447 (FIG. 20) rotatably mounted and associated with bearing holder strut 448. Buckets 449 form an integral part of fan wheel 447.

FIG. 21 is a view looking into the trailing edge of rotary wing 440 and shows flap 443 in a downward position exposing exit area 450. FIG. 22 shows flap 443 both in a position in which exit area 450 is restricted (full line) and also in a down position wherein the outlet or exit area is open (dotted lines).

Referring now to FIG. 23, wherein the elements of the thrust augmenting means utilizing a fixed fan are shown in their respective dispositions with respect to each other, a fragmentary sectional plan view is shown of a rotary wing 451 having a leading edge 452 and a trailing edge 453. Wing air duct 454 extends from the rotor (not shown) to converging portion 455, the air duct extends to a scroll 457 via portion 458. Scroll 457 forms a cylindrical chamber concentric with chamber 459. Chamber 459 extends from entrance 460 to exit 461, which exit terminates in a diverging section. Flap 462 extends adjacent the rear of exit 461, restricting the latter when in the position shown in FIG. 24. A fan wheel 463 is disposed concentrically within chamber 459 and held in a fixed relationship therewith by means of bearing struts 464 and 465 within which ball bearings 466 are mounted. Turbine buckets 467 are located at the periphery of fan wheel 463 such that fluid or air leaving scroll 457 impinges the buckets 467, thereby causing fan wheel 463 to rotate.

A flame holder 468 is disposed rearward and concentric with the fan wheel 463, having fuel nozzles 469 projecting from the flame holder towards the fan wheel. Fuel line 470 communicates with flame holder 468 supplying the latter with a predetermined and selected fuel. Sparkplug 471 is secured to conical member 462 which forms the diverging portion adjacent exit 461. Cable 473 electrically connects sparkplug 471 to remote controls (not shown).

In operation, compressed fluid or air is forced into wing air duct 454 and travels through portion 458 into scroll 457. Upon the fluid leaving scroll 457 it impinges turbine buckets 467, thereby imparting rotary motion to fan wheel 463. Fuel is caused to flow through fuel line 470 into flame holder 468 and out of nozzles 469 such that, upon ignition of sparkplug 471, combustion commences and is retained in the area of flame holder 468. Additional air enters entrance 460 while wing 451 is rotating in the direction shown by the arrow in FIGS. 23 and 25. Thus, upon the air being heated by the flame within flame holder 468, an expansion of the air takes place with a resulting increase in thrust. Of course it is within the scope of this invention to have valve means which controls the flow of compressed fluid in a predetermined and selected manner.

Control of this thrust augmentation is facilitated by varying the position of flap 462 by means of an actuator 474 located within wing 451 and shown in dotted lines in FIG. 23. Energy for actuation of flap 462 comes from compressed fluid which enters actuator 474 by means of conduit 475, which communicates with converging portion 455 through conical member 456, and with actuator 474. In a preferred embodiment of actuator 474, a piston is contacted by a helical spring 477 which biases piston 476 rearward. Connecting arm 478 is secured to piston 476 and, at the other end, is secured to a slotted member 479. Flap 462 has secured thereto two pivot arms 480 which are pivotally mounted to pins 481 which permit rotational movement of the arms 480 and flap 462. Upon activation of actuator 474, fluid enters actuator 474 on the rearward side of piston 476, such that piston 466 is forced forward against helical spring 477, compressing same and thereby moving flap 462 into an open position designated 462A in FIG. 25.

Thus, the embodiment shown in FIGS. 23-25 enables, upon giving a command control such as a twist at the control lever, the following steps, namely; generation of an increased air pressure within the ducting in the rotary wings which pressure causes piston 476 to move forward, thereby opening flap 462 and opening exit 461; compressed air enters scroll 457 and imparts rotary motion to fanwheel 463; fuel is caused to flow through fuel line 470 into flame holder 468 and out of nozzles 469; and sparkplug 471 is excited, thereby igniting the air fuel mixture and causing the combustion process. After and during the foregoing steps, heated fluid or gas is exhausted through exit 461.

Unobvious thrust augmentation is experienced due to the exit slot 461 increasing the circumference of the projected area against the ambient air. Furthermore, flap 462 enables the wing foil to exhibit higher lift coefficients in its open position at lower speeds. The result is a lower bleed flow, increased compression ratio, a substantially higher augmentation ratio, and lower or equal fuel consumption. In the embodiments shown in FIGS. 15-25, high efficiencies are experienced with the fixed fan arrangement shown enclosed within a chamber such as chamber 459. Another advantage of the embodiment described is the use of a "cold" fan made of predetermined materials such as aluminum.

Referring now to FIGS. 26 and 27, still another embodiment of the present invention is shown wherein a cowling 482 has formed as an integral part therewith members 483 which are shaped so as to deflect air entering slots in cowling 482 downward in a direction substantially perpendicular to fan wheel 485 disposed within wing 484. Flame holder 486 is disposed immediately to the rear of fan wheel 485 so as to provide the effect described for the embodiment shown in FIGS. 23-25. Note that fan wheel 485 is driven by fluid impinging buckets 487 after traveling through duct 488 in wing 484. Flap 489 together with flap arms 490 may be actuated by means of an actuator similar to actuator 474 shown in FIG. 25. A primary advantage to the embodiment shown in FIG. 27 is the more streamlined and lower cowling which effects less wind resistance.

FIGS. 28-30 illustrate still further embodiments of the present invention in which different fan dispositions and arrangements are shown. Referring to FIG. 28, a wing assembly 491 is shown in a fragmentary sectional plan view wherein a chamber 492 is disposed adjacent the tip 493 of wing 491. A rotary fan wheel 494 similar to fan wheel 463, shown in FIG. 23, is held within chamber 492 by means of struts 495 within which a ball bearing or disc bearing 496 is positioned. Compressed air flowing through duct 497 enters scroll 498 and impinges buckets 499 of fan 494 at a high velocity, thereby imparting rotary motion to fan 494. In addition, air enters opening 500 of chamber 492. A flame holder 501 is disposed rearward and adjacent fan 494 and is supplied with fuel by means of fuel line 502. Sparkplug 503 is secured to member 504 so as to be able to ignite the air fuel mixture within chamber 492.

In operation, the heated air resulting from the combustion process is deflected inward within rotary wing assembly 491 toward the rotor and out exit 505 therein, flap 506 controlling the area of exit 505. Vanes disposed within and adjacent exit 505 deflect air to form a path shown by the arrows in FIG. 28.

FIG. 29 illustrates an embodiment of the present invention in which increased fan speeds are achieved due to a turbine effect resulting from heated air impinging buckets 507 of fan wheel 508 located within chamber 509. Struts 510 hold and position bearings 511 within which fan wheel 508 rotates.

In this embodiment two combustion processes are present. A preheating flame holder 512 and its associated sparkplug 513 are disposed within duct 514 which carries compressed air to the fan wheel. Fuel line 515 is split so as to provide flame holder 512 with fuel as well as flame holder 516. Sparkplug 517 is associated with flame holder 516 and is positioned so as to extend within chamber 509. Flap 518 is pivotally mounted so as to provide the effect hereto described for flap 462 shown in FIG. 25.

Thus, in operation, compressed air is caused to flow within duct 514 thereby supplying air to a combustion process limited to the area adjacent flame holder 512. The result is a heating of the compressed air within the confining boundaries of duct 514 and resulting in a marked increase in the velocity of the fluid due to expansion. This high velocity air strikes buckets 507 of fan wheel 508 causing higher rotational speeds of fan wheel 508 than would be achieved without the combustion process within duct 504. A second and primary combustion process takes place immediately rearward of rotary fan wheel 508 wherein flame holder 516, and associated sparkplug 517 control combustion, and further heating of air with a resulting further augmentation of thrust occurs.

Referring now to FIG. 30, an embodiment of the present invention is shown which will help to minimize gyroscopic forces upon subject aircraft. In this embodiment, the plane of a fan wheel 519 is substantially parallel to the direction of rotation of wing assembly 520. Fan wheel 519 rotates on bearings 520, thereby forcing air toward flame holder 521. Sparkplug 522 is disposed adjacent flame holder 521 so as to be able to initiate the combustion process within duct portion 523. The arrows shown in FIG. 30 illustrate the path of air being sucked into duct portion 523.

It is to be noted that the embodiments of the present invention shown in FIGS. 15–25 provide the augmentation of thrust in a rotary wing aircraft and, by means of the flaps rearward of the augmenting chambers in the various embodiments, drag is significantly decreased at will and, at the same time, a breaking action is accomplished by means of said flaps.

What is claimed is:

1. In a rotary wing aircraft, in combination, a fuselage, rotary wing means located over said fuselage, connecting means connecting said rotary wing means to said fuselage for rotation about an axis extending from a central portion of said rotary wing means downwardly through the fuselage, said rotary wing means including a plurality of wings which project outwardly from said axis and which terminate in outer tip portions, a plurality of thrust augmenters formed by a plurality of rotary blade means respectively located at said outer tip portions of said wings, compressor means carried by said fuselage, conduit means communicating with said compressor means and extending therefrom along said wings to said plurality of rotary blade means for delivering fluid compressed by said compressor means to said plurality of said rotary blade means for rotating the latter, and a plurality of positioning means respectively connected operative to said plurality of rotary blade means for displacing the latter respectively between positions where said plurality of rotary blade means are located respectively in substantially the same planes as said wings and positions where said plurality of said rotary blade means are respectively located substantially in planes which are perpendicular to the planes of said wings and extend longitudinally along said wings, whereby when said plurality of positioning means are actuated to position said blades in said planes which extend longitudinally along said wings and are substantially perpendicular thereto, the rotation of said plurality of rotary blade means will turn said rotary wing means about said axis relative to said fuselage.

2. In a rotary wing aircraft, in combination, a fuselage, rotary wing means located over said fuselage and including a plurality of wings which extend outwardly from a central portion of said rotary wing means and which respectively terminate in outer tip portions, connecting means connecting said rotary wing means to said fuselage for turning movement relative thereto about an axis extending through said central portion of said rotary wing means downwardly through said fuselage and said plurality of wings extending outwardly from said axis, a plurality of rotary blade means respectively located at said outer tip portions of said wings, a plurality of support means respectively supporting said plurality of rotary blade means at said outer tip portions of said wings for turning movement between rest positions where said plurality of rotary blade means are respectively located in substantially the same planes as said wings and operating positions where said plurality of rotary blade means are respectively located substantially in planes perpendicular to the planes of said wings and extending longitudinally along said wings, a plurality of turning means operatively connected to said plurality of rotary blade means, respectively, for turning the latter between said positions, compressor means carried by said fuselage, and conduit means communicating with said compressor means, extending along said wings, and also communicating with said plurality of rotary blade means for delivering compressed fluid thereto for rotating said rotary blade means so that when the latter are in said operating positions said wings will be rotated about said axis.

3. In a rotary wing aircraft, in combination, a fuselage, rotary wing means located over said fuselage and having an axis extending downwardly through said fuselage and including a plurality of wings which extend outwardly from said axis and which respectively terminate in outer tip portions, a plurality of rotary blade means respectively located at said outer tip portions, a plurality of support means respectively supporting said plurality of rotary blade means for turning movement at said outer tip portions respectively about axes which extend longitudinally of said wings between rest positions where said plurality of rotary blade means are located substantially in the same planes as said wings and operating positions where said plurality of rotary blade means are respectively located substantially in planes perpendicular to said wings, a plurality of turning means respectively connected to said plurality of rotary blade means for turning the latter between said positions, compressor means carried by said fuselage, and conduit means extending from and communicating with said compressor means, extending along said wings, and communicating with said plurality of rotary blade means for delivering compressed fluid thereto for rotating said plurality of rotary blade means.

4. In an aircraft as recited in claim 3, each of said rotary blade means including a single rotor.

5. In an aircraft as recited in claim 3, each of said rotary blade means including a pair of rotors which are respectively located one above and one below each wing when said rotary blade means are turned to their operating positions.

6. In an aircraft as recited in claim 3, each of said rotary blade means including an outer ring, a channel carried by and extending along said outer ring and communicating with said conduit means for receiving compressed fluid therefrom and for directing the fluid in a direction substantially parallel to the axis of said outer ring, an inner ring coaxial with said outer ring and surrounded by and spaced therefrom, a plurality of outer blades carried by said inner ring at the exterior thereof, extending between said inner ring and outer ring, and aligned with said channel for receiving compressed fluid therefrom to rotate said inner ring with said outer blades, and a plurality of inner blades connected to said inner ring at an inner surface thereof and extending inwardly therefrom toward the center of said inner ring.

7. In an aircraft as recited in claim 6, a support extending inwardly from said channel toward the center of said inner ring and operatively connected to said inner blades for supporting the latter for rotation about the axis of said rotary blades means, said inner blades carrying said inner ring and said inner ring carrying said outer blades.

8. In an aircraft as recited in claim 3, each of said rotary blade means including an outer ring supported by said support means for turning movement about said axis which extends longitudinally of said wing, an arcuate channel carried by and extended along said ring at one side thereof, said channel having an outer wall coinciding with said ring and an inner wall displaced inwardly of said outer ring, an inner ring of the same diameter of said inner wall of said channel aligned with said inner wall and coaxially surrounded by said outer ring, a plurality of outer blades respectively fixed to said inner ring at an outer surface thereof and extending therefrom toward said outer ring, said outer blades being aligned with said channel and said channel communicating with said conduit means to receive compressed fluid therefrom and to direct the compressed fluid axially of said rotary blade means against said outer blades to rotate the latter together with said inner ring, a plurality of inner blades surrounded by and fixed to said inner ring at an inner surface thereof, said inner blades extending from said inner ring substantially radially toward the axis of said inner ring, and a support carried by said channel and supporting said inner blades adjacent to the axis of said inner ring for rotation about said axis.

9. In an aircraft as recited in claim 7, said channel extending from a region where it communicates with said conduit means in opposite directions respectively through approximately 90° around the axis of said rotary blade means at each side of said conduit means.

10. In a rotary wing aircraft, in combination, a fuselage, rotary wing means located over said fuselage and having an axis extending downwardly through said fuselage, said rotary wing means including a plurality of wings extending outwardly from said axis and terminating respectively in outer tip portions, a plurality of rotary blade means respectively located at said outer tip portions, a plurality of support means respectively supporting said plurality of said rotary blade means for turning movement respectively about axes which extend longitudinally of said wings between rest positions where said plurality of rotary blade means are respectively located substantially in the same planes as said wings and operating positions where said plurality of rotary blade means are respectively located in planes perpendicular to said wings, compressor means carried by said fuselage, conduit means communicating with said compressor means and extending therefrom respectively along said wings to said plurality of rotary blade means for delivering compressed fluid from said compressor means to said plurality of rotary blade means for driving the latter, and a plurality of turning means respectively connected operatively to said plurality of rotary blade means for turning the latter between said positions, said plurality of turning means respectively communicating with said conduit means and responding automatically to flow of fluid therealong to said plurality of rotary blade means for turning said plurality of rotary blade means form said rest positions thereof to said operating positions thereof.

11. In an aircraft as recited in claim 10, said plurality of turning means respectively including cylinders which communicate with said conduit means, pistons slidable in said cylinders to be moved therein in response to flow of compressed fluid in said conduit means, and linkages respectively connecting said pistons to said plurality of rotary blade means for turning the latter from said rest positions to said operating positions when said pistons move in said cylinders in response to flow of compressed fluid along said conduit means to said plurality of rotary blade means and to said cylinders.

12. In an aircraft as recited in claim 11, a plurality of springs respectively connected operatively to said plurality of linkages for automatically urging the latter to positions which locate said plurality of rotary blade means in said rest positions thereof, the compressed fluid when flowing into said cylinders displacing said pistons in opposition to said plurality of springs, whereby when the flow of compressed fluid along said conduit means at the regions where said cylinders communicate therewith is terminated said springs will automatically return said plurality of rotary blade means to their rest positions.

13. In a rotary wing aircraft, in combination, a fuselage, rotary wing means located over said fuselage and having an axis extending downwardly through said fuselage, said rotary wing means including a plurality of wings extending outwardly from said axis and terminating in a plurality of outer tip portions, respectively, a plurality of rotary blade means respectively located at said outer tip portions, a plurality of positioning means respectively connected operatively to said plurality of rotary blade means for displacing the latter between rest positions located substantially in the same planes as said wings, respectively, nd operating positions located substantially in planes perpendicular and extending longitudinally of said wings, compressor means carried by said fuselage, conduit means communicating with and extending from said compressor means along said wings respectively to said plurality of rotary blade means for delivering compressed fluid thereto for driving said plurality of said rotary blade means, means in communication with the conduit means and responsive to the pressure in said conduit connected to the positioning means to displace the rotating blade means to operative position, a plurality of valve means carried by said conduit means respectively in the regions of said plurality of rotary blade means, said valve means being intermediate the rotating blade means and the point of communication of the pressure responsive means with the conduit and having open positions, respectively, maintaining communication between said plurality of rotary blade means and said conduit means and closed positions respectively cutting off communication between said plurality of rotary blade means and said conduit means, and brake means for automatically braking the rotation of said rotary wing means when said valves are displaced from their open to their closed positions.

14. In a rotary winged aircraft, in combination, a fuselage, rotary wing means located over said fuselage and having an axis extending downwardly through said fuselage, connecting means connecting said rotary wing means to said fuselage for rotation about said axis, said rotary wing means including a plurality of wings respectively extending outwardly from said axis and respectively terminating in outer tip portions, a plurality of rotary blade means respectively located at said outer tip portions, a plurality of support means respectively supporting said plurality of rotary blade means for turning movement respectively about axes which extend longitudinally of said wings between rest positions where said plurality of rotary blade means are located substantially in the same planes as said wings and operating positions where said plurality of rotary blade means are respectively located substantially in planes which are perpendicular to said wings, compressor means carried by said fuselage, conduit means extending from said compressor means along said wings to said plurality of rotary blade means for delivering thereto compressed fluid derived from said compressor means, a plurality of branch conduits respectively branching from said conduit means to leading edges of said wings, a plurality of valve means located adjacent said plurality of rotary blade means in said conduit means between said plurality of rotary blade means and said branch conduits adjacent thereto, respectively, said plurality of valve means having open positions closing said branch conduits and providing communication between said conduit means and said plurality of rotary blade means and closed positions cutting off said communication between said rotary blade means and said conduit means and opening said branch conduits, so that when said plurality of valve means are in their closed positions the compressed fluid will be deflected from said rotary blade means out through the leading edges of said wings to brake the rotation of said rotary wing means, and a plurality of turning means respectively connnected to said plurality of rotary blade means turning the latter between said positions, said plurality of turning means communicating with said conduit means upstream of said valve means, and said plurality of turning means respectively responding automatically to the flow of fluid in said conduit means for turning said plurality of rotary blade means from their rest to their operating positions, whereby said plurality of turning means will maintain said plurality of rotary blade means in their operating positions when said valves are in their closed positions as well as when said valves are in their open positions.

15. In a rotary wing aircraft, in combination, a fuselage, rotary wing means located over said fuselage and having an axis extending downwardly through said fuselage, said rotary wing means including a plurality of wings extending outwardly from said axis and terminating in a plurality of outer tip portions, respectively, a plurality of rotary blade means respectively located at said outer tip portions, a plurality of positioning means respectively connected operatively to said plurality of rotary blade means for displacing the latter between rest positions located substantially in the same planes as said wings, respectively, and operating positions located substantially in planes perpendicular and extending longitudinally of said wings, compressor means carried by said fuselage, conduit means communicating with and extending from said compressor means along said wings respectively to said plurality of rotary blade means for delivering compressed fluid thereto for driving said plurality of said rotary blade means, a plurality of valve means carried by said conduit means respectively in the regions of said plurality of rotary blade means and having open positions, respectively, maintaining communication between said plurality of rotary blade means and said conduit means and closed positions respectively cutting off communication between said plurality of rotary blade means and said conduit means, and brake means for automatically braking the rotation of said rotary wing means when said valves are displaced from their open to their closed positions, said wings respectively having leading edges, and said brake means including branch conduits respectively branching from said conduit means to said leading edges of said wings to direct fluid out through said leading edges, said plurality of valve means when in their open positions closing said branch conduits and when in their closed positions opening said branch conduits and preventing fluid from reaching said plurality of rotary blade means so that the fluid necessarily flows out through said branch conduits to discharge at said leading edges of said wings to brake the rotation of said rotary wing means, a plurality of closure flap means respectively carried by said wings at said leading edges thereof in alignment with said branch conduits for automatically closing the latter except when compressed fluid is discharged therethrough, said closure flap means responding automatically to the flow of fluid toward said leading edges in said branch conduits to open the latter and free the fluid for discharge through said leading edge.

16. In an aircraft, a fluid-driven rotary wing, a plurality of engines, a plurality of compressors having different outputs and respectively driven by said engines, connecting means connecting the outputs of said compressors simultaneously or separately, at the option of the operator, to said rotary wing to drive said rotary wing, any one of said outputs being sufficient to support the aircraft aloft, and a propeller connected to one only of said engines for propelling the aircraft forwardly, whereby when the outputs of said plurality of compressors are simultaneously connected to said rotary wing the latter may be driven with a force sufficient to raise the aircraft even when it is heavily loaded.

17. In an aircraft, a fluid-driven rotary wing means including a plurality of wings respectively having outer tips, a pair of engines, a compressor driven by one of said engines, connecting means connecting the output of said compressor to said rotary wing means to drive said rotary wing means, said rotary wing means carrying a plurality of thrust augmenters respectively situated at said tips of said wings of said rotary wing means and driven by said compressor, and a plurality of positioning means respectively connected operatively to said plurality of thrust augmenters for displacing the latter respectively between positions where they are located respectively in substantially the same planes as said wings and positions where they are respectively located substantially in planes which are perpendicular to the planes of said wings and extend longitudinally along said wings, whereby when said plurality of positioning means are actuated to position said augmenters in said planes which extend longitudinally along said wings and are substantially perpendicular thereto, operation of said augmenters will turn said rotary wing means, and a propeller connected to the other of said engines for propelling the aircraft forwardly.

18. A fluid-driven rotary wing craft comprising a fuselage, a plurality of rotary wings respectively having outer tips rotatively mounted over said fuselage, an engine carried by said fuselage, a compressor driven by said engine, connecting means connecting the output of said compressor to said rotary wings to drive said rotary wings, a plurality of thrust augmenters situated at the tips of each of said rotary wings and driven by said compressor, a plurality of positioning means operatively connected to said thrust augmenters for displacing the latter respectively between positions substantially in the same plane as said wings and positions substantially perpendicular to the plane of said wings, and a propeller mechanically linked to said engine for propelling the aircraft forward.

19. A rotary wing aircraft comprising a fuselage, an engine carried by said fuselage, a compressor driven by said engine, a plurality of rotary wings disposed at the upper portion of said fuselage, means for conducting the output of said compressor to the tips of said wings, a propeller disposed at the aft position of said fuselage mechanically linked to said engine, a plane surface extending longitudinally from the rear surface of said fuselage on the top and bottom thereof, and a plurality of thrust augmenters disposed at the tip of each of said rotary wings driven by said compressor.

20. A craft as in claim 19 further comprising a strut extending from the lower edge of said plane surface to protect the plane surface from striking the ground when said aircraft is landing.

21. In a rotary wing aircraft, the improvement comprising means for augmenting thrust, comprising a rotary blade fan disposed within a chamber formed by a portion of a rotary wing near the tip thereof, said chamber having an inlet at the leading edge of said rotary blade and an exit in the trailing edge thereof, said portion further forming a scroll concentric with said chamber, said fan comprising a plurality of bucket-shaped members disposed along the periphery of said fan, a portion of each of said buckets disposed within said scroll, a plurality of blades secured to said members for rotation therewith, conduit means disposed within said wing and extending substantially perpendicular to the axis of said chamber and communicating with the scroll for conducting compressed fluid to said scroll, a flameholder disposed within said chamber adjacent said fan aft of the latter, a fuel line communicating with said flameholder, a sparkplug, a portion of which is disposed adjacent said flameholder.

22. A rotary wing aircraft according to claim 21, further comprising flap means pivotally mounted to said portion and extending to the rear of the chamber exit, and means for moving said flap means from closed to open position and vice versa.

23. A rotary wing aircraft according to claim 22, wherein said means for moving said flap comprises a housing, a piston slidably disposed within said housing, spring means disposed within said housing for biasing said piston rearward, and a connecting rod secured at one end to said piston, the other end being pivotally secured to a portion of said flap means whereby when fluid enters said housing and forces said piston rearwards against spring pressure said flap is pivoted to said open position at the rear of said chamber exit.

24. In a rotary wing aircraft according to claim 3 wherein said fuselage is in a bulbous form.

25. A rotary wing aircraft according to claim 23 wherein said piston is located under said conduit means, and said portion of the flap is a depending portion, and additional pivots for said flap being mounted in said housing above the pivot on said depending portion.

26. In a rotary wing aircraft, in combination, a bulbous fuselage having a rear fin extending substantially parallel to said fuselage, a rotary wing means located over said fuselage, means for connecting said rotary wing means to said fuselage for rotation about an axis extending from a central portion of said rotary wing means downwardly through said fuselage, a prime mover, a compressor operated by said prime mover, both said prime mover and compressor being carried by said fuselage, conduit means connecting said compressor with said rotary wing means for delivering fluid compressed by said compressor to said rotary wing means for rotating the latter about said axis relative to said fuselage, and said prime mover being provided with an exhaust tube through which a stream of exhaust gases is propelled therefrom into direct contact with said fin to aid in stabilizing said aircraft, and swash plate apparatus in said conduit means operating to allow the pitch of the rotary wings to be varied during rotation thereby providing normal helicopter operation.

27. In a rotary wing aircraft, in combination, a bulbous fuselage having a rear fin extending from said fuselage, rotary wing means, means for connecting said rotary wing means to said fuselage for rotation about an axis extending from a central portion of said rotary wing means through said fuselage, a prime mover, a compressor operated by said prime mover, both said prime mover and compressor being carried by said fuselage, conduit means connecting said compressor with said rotary wing means for delivering fluid compressed by said compressor to said rotary wing means for rotating the latter about said axis relative to said fuselage, and said prime mover being provided with an exhaust tube through which a stream of exhaust gases is propelled therefrom into direct contact with said fin to aid in stabilizing said aircraft, and swash plate apparatus in said conduit means operating to allow the pitch of the rotary wings to be varied during rotation thereby providing normal helicopter operation.